Figure 1:
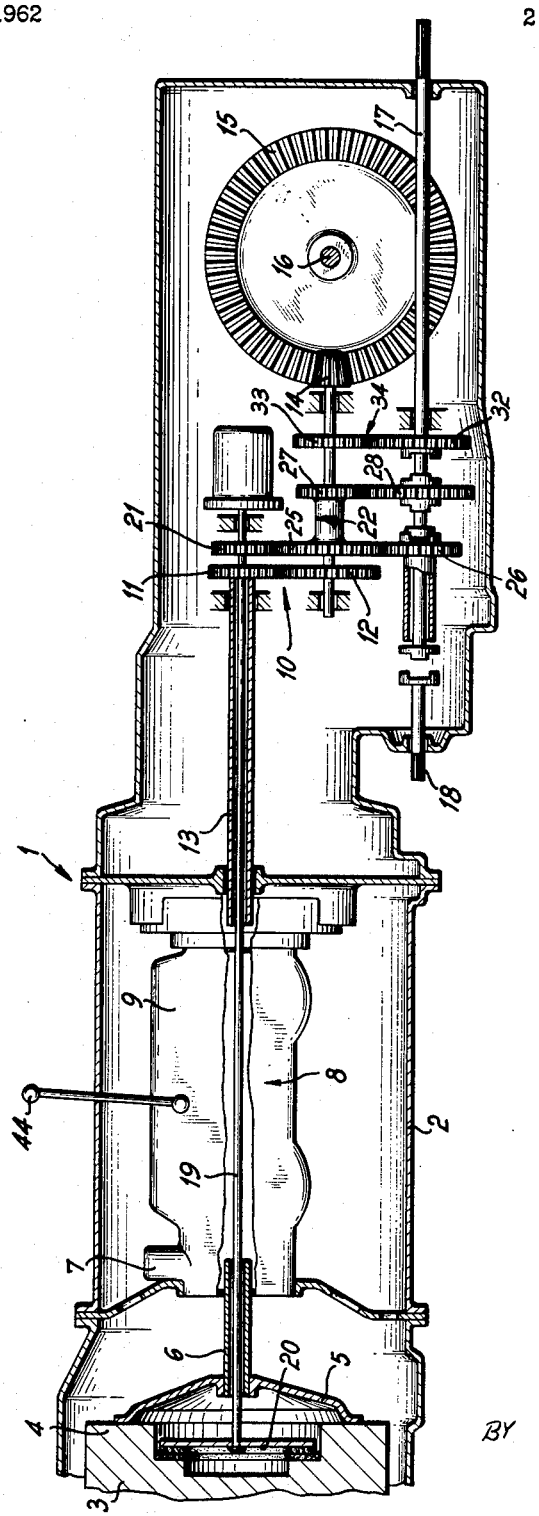

Sept. 7, 1965

K. RUOFF 3,204,468

TRANSMISSION FOR TRACTORS

Filed Aug. 6, 1962

2 Sheets-Sheet 1

INVENTOR:
KARL RUOFF

BY Dicke + Craig

ATTORNEYS

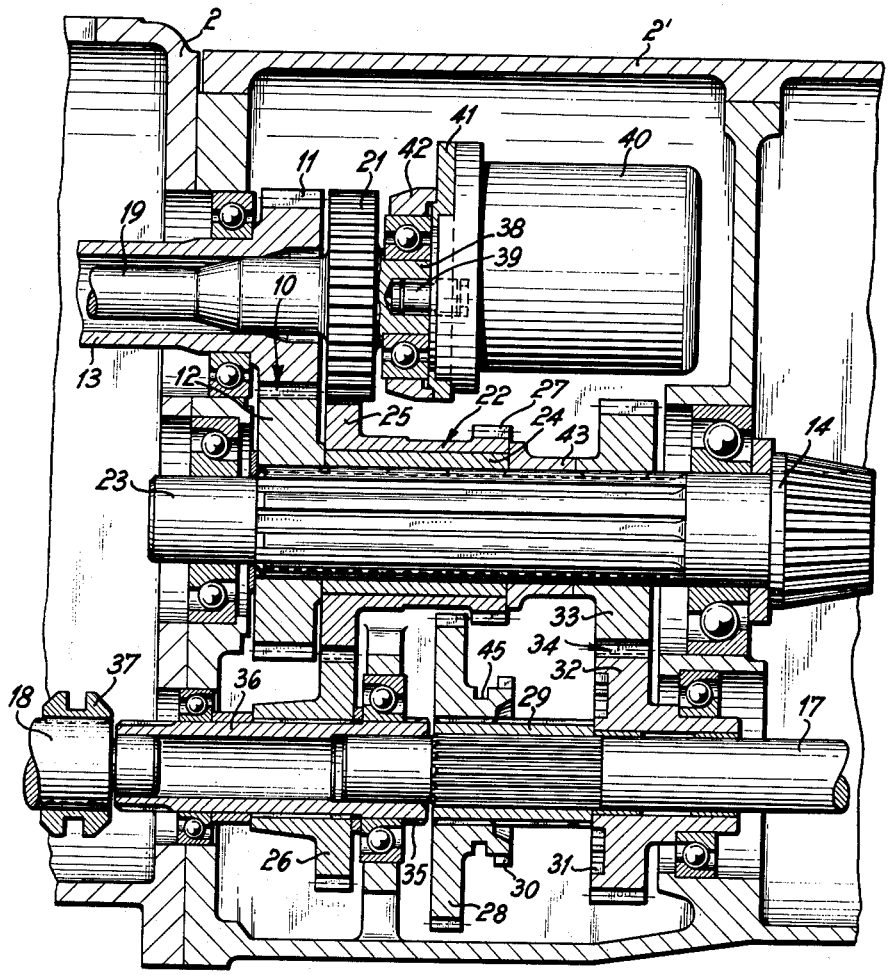

United States Patent Office 3,204,468
Patented Sept. 7, 1965

3,204,468
TRANSMISSION FOR TRACTORS
Karl Ruoff, Kirchheim, Teck, Germany, assignor to Firma Dr. Ing. h.c. F. Porsche K.G., Stuttgart-Zuffenhausen, Germany
Filed Aug. 6, 1962, Ser. No. 214,897
Claims priority, application Germany, Aug. 16, 1961, P 27,718
14 Claims. (Cl. 74—15.4)

The present invention relates to a transmission for tractors, especially agricultural tractors provided with a transmission adapted to be adjusted in a stepless or continuous manner and connected directly with the engine which includes a reduction gear, operatively connected behind the transmission and drivingly connected with the transmission output shaft, and a take-off shaft adapted to be selectively driven in dependence on the driving speed thereof or on the engine speed at one of several different transmission ratios whereby the driving shaft for the take-off shaft is adapted to be coupled to the engine.

In drive units for agricultural tractors in which a stepless or continuously adjustable transmission is included, the drive for the take-off shaft presents considerable difficulties by reason of the ever increasing demands which are made of the same. In order to effect the various drives of the take-off shaft, a complicated and relatively expensive transmission construction results which is the case, in particular, with constructions in which the different steps or transmission ratios of the drive for the take-off shaft in dependence on the engine speed are derived between the engine and the continuously adjustable transmission. Additionally, with such construction, it is not possible by reason of the given shaft grouping of the transmission to drive the auxiliary drives of the tractor such as, for example, the mowing implement, the hydraulic pump, or the filling pump with the use of a hydrostatic transmission, without accepting also several intermediate connecting gears and intermediate shafts.

According to the present invention, these disadvantages are avoided by arranging the transmission output shaft between the take-off shaft and the drive shaft thereof disposed above the wheel drive shaft and extending through the continuously adjustable transmission and by constituting the transmission output shaft the axis of rotation of a two-step connecting gear which serves for the driving connection between the driving shaft and the take-off shaft. A simple and space-saving transmission construction is obtained thereby in which intermediate shafts are saved and the driving shaft for the take-off shaft may be used for additional auxiliary drives. The units or aggregates such as, for example, the hydraulic pump of the tractor which are adapted to be drivingly connected with the driving shaft for the take-off shaft may be flangedly secured directly in prolongation of the shaft since sufficient space now remains between the upper surface of the transmission and the transmission output shaft by the chosen position of the transmission shafts relative to one another in order to accommodate the aforementioned units or aggregates. Additionally, the accessibility to the auxiliary units is also assured as they are to be installed near the transmission top side by the use of a removable cover.

The connecting gear is advantageously constituted by a double toothed gear wheel which is arranged freely rotatable on the transmission output shaft coordinated to the continuously adjustable transmission, intermediate the driving gear wheel thereof and a connecting gear for the drive of the take-off shaft in dependence on the driving speed of the tractor. By the use of such an arrangement, there is achieved a further simplification and simultaneously therewith is attained a favorable shifting possibility for the different drives of the take-off shaft since the two steps or transmission ratios of the drive for the take-off shaft in dependence on the engine speed as well as also the step or transmission ratio for the drive of the take-off shaft in dependence on the speed of the tractor may be selectively actuated with a single shifting element. The shifting element may be constituted thereby by the driving gear wheel itself of the take-off shaft which is in meshing engagement with the connecting gear.

Accordingly, it is an object of the present invention to provide a selectively operable transmission for a tractor, particularly for an agricultural tractor of the type described hereinabove which eliminates, by simple means, the shortcomings and inadequacies encountered in the prior art constructions.

It is another object of the present invention to provide a transmission unit for a tractor, particularly one provided with a continuously adjustable transmission interconnected between the engine and the driving wheels of the tractor, which permits, by simple manipulation, a versatile, selectively engageable multi-speed drive for the take-off shaft of the tractor while enabling also a simple drive arrangement for the drive of auxiliary units.

Still a further object of the present invention resides in the provision of a transmission for agricultural tractors which, in addition to providing a driving connection between the engine and the driving wheels of the tractor, enables a drive arrangement for the take-off shaft that offers a large versatility in the driving connection for the take-off shaft obtainable therewith without complicated and expensive lay-outs.

Still another object of the present invention resides in the provision of a tractor transmission provided with a continuously adjustable transmission in which the different transmission ratios or steps for the drive of the take-off shaft in dependence on the engine speed are derived between the engine and the continuously regulatable transmission, which is simple and compact in construction and which additionally does not involve substantial expenditures as compared to transmissions of lesser versatility.

A further object of the present invention resides in the provision of a tractor transmission, particularly of the type utilizing a continuously regulatable transmission between the engine and the driving wheels in which the number of connecting gears and intermediate shafts is reduced to a minimum notwithstanding the possibility of drivingly interconnecting also auxiliary aggregates in an extremely simple manner.

Another object of the present invention resides in the provision of a transmission for tractors in which the auxiliary units or aggregates may be readily accommodated and installed by being located in extension of the transmission output shaft, and more particularly in such a manner as to be readily accessible as well as easily assembled and disassembled from the designated transmission area.

Still another object of the present invention resides in the provision of a transmission arrangement for agricultural tractors which enables simple shifting for the various selectively engageable drives of the take-off shafts.

These and other objects, features and advantages of the present invention will become more obvious from the following description when taken in connection with the accompanying drawing which shows, for purposes of illustration only, one embodiment in accordance with the present invention, and wherein:

FIGURE 1 is a schematic side view of a tractor drive transmission provided with a continuously adjustable hydrostatic transmission and with a transmission arrangement for the drive of the take-off shaft in accordance with the present invention, and FIGURE 2 is a partial longitudinal cross sectional view, on an enlarged scale, through the transmission output and the drive of the take-off shaft as well as of the auxiliary units according to FIGURE 1.

Referring now to the drawing wherein like reference numerals are used throughout the two views to designate like parts, and more particularly to FIGURE 1, reference numeral 1 designates therein the transmission drive unit of the tractor which comprises a multi-partite transmission housing 2 forming simultaneously the rear end of the tractor. The engine 3, not shown in detail, is flangedly connected to the front end of the transmission housing 2. The pump part 7 of the hydrostatic transmission 8, of any conventional construction, is operatively connected with the fly-wheel 4 of the engine 3 through a bell-shaped driving member 5 and a hollow shaft 6. A single-step or single-transmission-ratio speed reduction gear generally designated by reference numeral 10 is operatively connected to the rear of the motor part 9 of the hydrostatic transmission 8 by means of hollow shaft 13. The single-step speed reduction gear 10 is constituted by a pair of gear wheels 11 and 12 which are in constant meshing engagement with each other. The gear wheel 11 of the speed reduction gear 10 is operatively connected by means of a hollow shaft 13 with the motor part 9 of the hydrostatic transmission 8 whereas the gear wheel 12 is connected for rotation in unison, for example, by means of a splined connection, with the transmission output shaft 23 and therewith with the drive pinion 14. The wheel drive shafts 16 of the tractor are set into rotation, for purposes of driving the tractor, by the output shaft 23 and by the drive pinion 14 through a bevel spur gear 15 and a differential gear (not shown in detail).

A take-off shaft 17 extends within the transmission housing 2 below the wheel drive shafts 16. A mower drive shaft 18 extends forwardly of and coaxially to the take-off shaft 17. The drive for both shafts 17 and 18 takes place by means of a drive shaft 19 which extends through the hollow output shaft 13, through the hydrostatic transmission 8 as well as through the hollow input shaft 6 and which is adapted to be coupled directly with the fly-wheel 4 of the engine 3 by means of a friction-disk clutch 20 of any suitable construction. The drive shaft 19 extends above the wheel drive shafts 16 and is provided at the free rear end thereof with a gear wheel 21 that is in constant meshing engagement with a double gear wheel generally designated by reference numeral 22 of differing numbers of teeth for the two-step or two-ratio-drive of the take-off shaft 17.

As shown more clearly in FIGURE 2, the double gear wheel 22 is supported in a freely rotatable manner on a bushing 24 operatively connected with the output shaft 23 driving the drive pinion 14. The one gear wheel 25 of the double gear 22 is in constant meshing engagement with a gear wheel 26 whereas the other gear wheel 27 thereof is adapted to be selectively coupled with a shifting gear wheel 28. The shifting gear wheel 28 is operatively connected with the input end of the take-off shaft 17 by means of a splined sleeve 29 to rotate in unison therewith while enabling axial displacement relative thereto. Coupling teeth 30 are arranged at the shifting gear wheel 28 which may be brought into selective engagement with corresponding complementary apertures 31 provided in gear wheel 32 rotatably supported on the take-off shaft 17. The gear wheel 32 is in constant meshing engagement with a gear wheel 33 suitably connected, for example, by a splined connection for common rotation with the transmission output shaft 23. The gear wheels 32 and 33 form a connecting gear generally designated by reference numeral 34 for the drive of the take-off shaft 17 in dependence on the driving speed of the tractor.

The shifting gear wheel 28 additionally is adapted to be selectively connected with the toothed or splined end 35 of a hollow shaft 36 on which is retained in a non-rotatable manner the gear wheel 26. The take-off shaft 17 as well as the mower drive shaft 18 are supported within the hollow shaft 36. The mower drive shaft 18 is adapted to be selectively coupled to the hollow shaft 36 by means of a coupling sleeve 37. The gear wheel 21 of the drive shaft 19 which drives the double gear wheel 22 is provided with a connecting pin portion 38 for the coaxial connection of the drive shaft 39 for a power-assist pump 40. The power-assist pump 40 is secured at a flange 41 of a web-like bearer cross piece 42 of the transmission housing 2. The bearer cross piece 42 forms simultaneously therewith one of the bearing places for the drive shaft 19. Instead of or in addition to the power-assist pump 40, other aggregates of the tractor, for example, the filling pump of the hydrostatic transmission 8 may also be driven by the arrangement illustrated in FIGURE 2. The aggregates are thereby readily accessible in the transmission housing 2 by means of a removable cover 2'.

*Operation*

During rotation of the engine, the bell-shaped driving member 5 is driven by means of the engine-fly-wheel 4, and the bell-shaped driving member 5, in turn, initially drives the pump 7 of the hydrostatic transmission 8 by means of the hollow transmission input shaft 6. If the selector lever 44 of the transmission 8 is in the neutral position thereof as shown in FIGURE 1 of the drawing, then the further drive to the wheels is interrupted and the tractor stands still. If the selector lever 44 is displaced from the neutral position thereof into a driving position thereof, then the pump 7 starts to rotate the motor 9 of the hydrostatic transmission 8 whereby the transmission output shaft 23 and therewith the driving pinion 14 are driven by means of the hollow output shaft section 13 and the speed reduction gear 10 including the gear wheels 11 and 12 thereof. In continuation of the train of transmission toward the wheels of the tractor, the driving pinion 14 drives through the spur bevel gear 15 and the differential (not shown) the wheel drive shafts 16 and therewith the wheels of the tractor to move the tractor at a speed determined by the engine speed and the setting of the selector lever 44 and the speed reduction of speed reduction gear 10.

Independently of the drive of the tractor or in association therewith, the friction clutch 20 operatively associated with the drive shaft 19 may be selectively brought into frictional engagement with the fly-wheel 4 of the engine 3. The double gear wheel 22 is thereby set into rotation by the drive shaft 19, now rotating at the engine rotational speed, through the gear wheel 21, and simultaneously therewith the hydraulic pump 40 is also driven from the drive shaft 19. If, prior to the engagement of the friction clutch 20, the shifting gear wheel 28 is brought into meshing engagement with the gear wheel 27 of the double gear 22, then the take-off shaft 17 is driven by means of the splined sleeve 29 with engine rotational speed, reduced however, by the selected transmission ratio of the gear wheels 21, 27 and 28, for example, at normal or standard speed. If, in contradistinction thereto, the shifting gear wheel 28 is in meshing engagement with the toothed end 35 of the hollow shaft 36, then the drive for the take-off shaft 17 in dependence on the engine speed takes place through gear wheels 25 and 26 with the rotational speed of the selected transmission ratio of the gear wheels 21, 25 and 26 which is higher than the normal rotational speed. With rapidly rotating engines having a relatively higher rotational speed, it may be necessary for reasons of the desired rotational speed of the take-off shaft 17 to provide a larger speed reduction between the drive shaft 19 and the take-off shaft 17. In that case, it is of advantage to insert between the gear wheel 21 and the double gear wheel 22 an intermediate gear which effectuates a larger speed reduction of the overall transmission ratio.

The drive for the take-off shaft 17 in dependence on the speed of the tractor is derived from the connecting gear generally designated by reference numeral 34, the gear wheel 33 of which rotates at the speed of the output shaft 23 and therewith at the speed of the drive pinion 14. In order to provide an operative connection of the connecting gear 34 with the take-off shaft 17, it is necessary to bring the coupling teeth 30 of the shifting gear wheel 28 into engagement with the complementary apertures 31 of the gear wheel 32 freely rotatable on the take-off shaft 17. The take-off shaft is thereby driven through gear wheels 33 and 34, the shifting gear wheel 28 and the splined bushing 29 in proportion to the driving speed of the tractor, that is, in dependence on the setting of the hydrostatic transmission 8. A shifting fork operatively connected with a manually operable shifting lever (not shown) of any known, conventional construction, which engages into the annular groove 45 of the shifting gear wheel 28 serves thereby for the displacement of the shifting gear wheel 28 into the various operating positions thereof. Since such an arrangement is well known in the prior art, a detailed showing thereof is dispensed with herein.

The drive of the shaft 18 for the mowing implement is derived via the gear wheels 21, 25 and 26 and the hollow shaft 36 which rotate constantly with an engaged friction clutch 20. The drive shaft 18 for the mowing implement is set into rotation by the connection of the coupling sleeve 37 with the hollow shaft 36. The drive shaft 18 for the mowing implement and the take-off shaft 17 may also be driven simultaneously since the shifting gear wheel 28 is, independently thereof, adapted to be selectively connected with the hollow shaft 36 as well as with the gear wheel 27 of the double gear wheel 22 and additionally also with the gear wheel 34 of the drive in dependence on the speed of the tractor.

By the use of the arrangement described hereinabove, a transmission construction is created which does justice with few and simple means to all requirements both as regards the vehicle drive and the take-off shaft, and which additionally makes it possible with a small number of bearing places to drive further auxiliary aggregates without large expenditures which results in a considerable reduction in cost for relatively expensive continuously adjustable transmissions.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A transmission arrangement for tractors, especially agricultural tractors, having an engine, a continuously adjustable hydrostatic transmission directly connected with the input shaft thereof to said engine and having a transmission output shaft, and wheel-drive-shaft means, comprising reduction gear means operatively connected with the input gear thereof to said output shaft, to the rear of the transmission as viewed in the normal direction of the transmission of torque, a driven shaft operatively connected to the output gear of said reduction gear means, a takeoff shaft, a drive shaft for said take-off shaft adapted to be operatively connected to said engine, said drive shaft being disposed above the wheel-drive shaft means and extending through said continuously adjustable transmission, and selectively engageable means for driving said take-off shaft either at a variable speed corresponding to the speed of the tractor or at one of several speeds in dependence on the engine including said drive shaft and two-speed connecting gear means including a double gear wheel comprising two coaxial gear members freely rotatably mounted on said driven shaft and operably connected to said drive shaft for said take-off shaft, said selectively engageable means for driving said take-off shaft at the speed of the tractor including meshing gears on said driven shaft and on said power take-off shaft, respectively, said meshing gears being operably connected to said reduction gear means and driven thereby.

2. A transmission arrangement for tractors, especially agricultural tractors, having an engine, a continuously adjustable hydrostatic transmission directly connected with the input shaft thereof to said engine and having a transmission output shaft, and wheel-drive-shaft means comprising reduction gear means operatively connected with the input gear thereof to said output shaft, to the rear of the transmission as viewed in the normal direction of the transmission of torque, a driven shaft operatively connected to the output gear of said reduction gear means, a take-off shaft, a drive shaft for said take-off shaft adapted to be operatively connected to said engine, said drive shaft being disposed above said driven shaft and extending through said continuously adjustable transmission, and selectively engageable means for driving said take-off shaft either at a variable speed corresponding to the speed of the tractor or at one of several speeds in dependence on the engine including said drive shaft and two-speed connecting gear means operatively and selectively connecting said drive shaft with said take-off shaft, said driven shaft being disposed between said drive shaft and said take-off shaft and said driven shaft forming effectively the axis of rotation of said connecting gear means, said connecting gear means including a double gear wheel comprising two coaxial gear members freely rotatably supported on said driven shaft, said selectively engageable means including selectively engageable connecting gear means operatively connecting said driven shaft with said take-off shaft and providing the drive connection for the take-off shaft in dependence on the tractor speed, said double gear wheel being disposed intermediate a gear forming part of said reduction gear means and said selectively engageable connecting gear means, said gear forming part of said reduction gear means being splined to said driven shaft.

3. A transmission arrangement for tractors, especially agricultural tractors, having an engine, a continuously variable hydrostatic transmission operatively connected with the input shaft thereof to said engine and having a transmission output shaft and wheel drive shaft means, comprising reduction gear means operatively connected with said output shaft to the rear of the transmission as viewed in the normal direction of the transmission of torque, a driven shaft operatively connected to said reduction gear means, a take-off shaft, a drive shaft for said take-off shaft adapted to be operatively connected to said engine, said drive shaft being disposed above the wheel drive shaft means and extending through said transmission, and selectively engageable means for driving said take-off shaft either at a variable speed corresponding to the speed of the tractor or at one of several speeds in dependence on the engine including said drive shaft and two-speed connecting gear means including a double gear wheel comprising two coaxial gear members freely rotatably mounted on said driven shaft and operably connected to said drive shaft for said take-off shaft, said selectively engageable means for driving said take-off shaft at the speed of the tractor including meshing gears on said driven shaft and on said power take-off shaft, respectively, said meshing gears being operatively connected to said reduction gear means and driven thereby, and said driven shaft forming the axis of rotation of said connecting gear means, said selectively engageable means further including a member carried by said take-off shaft and selectively shiftable into operative connection with one of said two coaxial gear members of said double gear or one of said meshing gears.

4. In a tractor having an engine and a continuously adjustable hydrostatic transmission provided with transmission input shaft means and transmission output shaft means, the latter being operable to drive the wheels of the tractor, a main take-off shaft and an auxiliary take-off shaft as well as at least one auxiliary unit intended to be driven by the engine, the improvement essentially consisting of drive means for said take-off shafts including a drive shaft coaxial with at least a section of said transmission output shaft means and extending through said transmission, means for operatively connecting said drive shaft with said engine, and selectively engageable gear means operatively connecting said drive shaft with said main take-off shaft and said auxiliary take-off shaft including a plurality of gears coaxially arranged about a further section of said transmission output shaft means, said last-mentioned section being disposed above said take-off shaft and below said drive shaft, said auxiliary unit being drivingly connected to said drive shaft, and means including said gears for selectively driving said main take-off shaft at several speeds including a variable speed proportional to the speed of the tractor and a plurality of speeds proportional to the engine speed independent of the speed of the tractor, said means including said gears further including two meshing gears, one of said meshing gears being fixed to said further section of said transmission output shaft means and the other of said meshing gears being rotatably mounted on said main take-off shaft, a gear-clutch member slidably splined on said main power take-off shaft and adapted selectively to mesh with one of said plurality of gears and to be slidably moved into clutching engagement with said rotatably mounted gear on said main take-off shaft, and a gear secured to said auxiliary take-off shaft driven by another gear of said plurality of gears, and means for selectively connecting said gear secured to said auxiliary take-off shaft to said main take-off shaft.

5. In a tractor having an engine and a continuously adjustable hydrostatic transmission provided with transmission input shaft means and transmission output shaft means having a plurality of sections, the latter being operable to drive the wheels of the tractor, a main take-off shaft and an auxiliary take-off shaft as well as at least one auxiliary unit intended to be driven by the engine, the improvement essentially consisting of drive means for said take-off shafts including a drive shaft coaxial with at least one of said sections of said transmission output shaft means and extending through said transmission, means for operatively connecting said drive shaft with said engine, and selectively engageable gear means operatively connecting said drive shaft with said main take-off shaft and said auxiliary take-off shaft including a plurality of gears coaxially arranged about a further one of said sections of said transmission output shaft means, said auxiliary unit being disposed substantially in extension of said drive shaft and being drivingly connected to said drive shaft, and means including said gears for selectively driving said main take-off shaft at a variable speed proportional to the speed of the tractor and a plurality of speeds proportional to the engine speed independent of the speed of the tractor, said means including said gears further comprising a combined gear and clutch member slidably splined on said main power take-off shaft and adapted to mesh with one of said plurality of gears, a gear-clutch member on said main take-off shaft adapted to be clutchingly engaged by said combined gear and clutch member, said gears including a gear fixed to said auxiliary take-off shaft in mesh with another of said plurality of gears on said further one of said sections.

6. In a transmission arrangement for tractors, especially agricultural tractors, provided with wheel drive shafts and with a transmission operatively connected directly with the engine, said arrangement including a driven shaft and speed reduction gearing drivingly connected to the gear of said transmission and operatively connecting said transmission with said driven shaft which is operable, in turn, to drive said wheel-drive-shafts, a take-off shaft, and selectively engageable means for driving said take-off shaft either at a variable speed corresponding to the speed of the tractor or at one of several speeds in dependence on the engine speed, said arrangement including a drive shaft adapted to be selectively coupled to the engine, the improvement essentially consisting of arranging said driven shaft between the take-off shaft and said drive shaft, said drive shaft extending through said transmission, and a two-speed connecting gear means which serves for the driving connection between said drive shaft and said take-off shaft, said two speed connecting gear means including a double gear wheel comprising two coaxial gear members freely rotatably mounted on said driven shaft and operably connected to said drive shaft, and selectively engageable means for driving said take-off shaft at the speed of the tractor including meshing gears on said driven shaft and on said power take-off shaft, respectively, said meshing gears being operatively connected to said speed reduction gearing and driven thereby.

7. In a transmission arrangement for tractors, especially agricultural tractors, provided with a continuously regulatable hydrostatic transmission operatively connected directly with the engine, said arrangement including a driven shaft and speed reduction gearing drivingly connected to the rear of said transmission, means including said speed reduction gearing operatively connecting said transmission with said driven shaft which is operable, in turn, to drive the wheel-drive-shafts, a take-off shaft, and selectively engageable means for driving said take-off shaft either in dependence on the speed of the tractor or at one of several speeds in dependence on the engine speed and having a drive shaft adapted to be selectively coupled to the engine, the improvement essentially consisting of arranging said driven shaft between the take-off shaft and said drive shaft, said drive shaft being disposed above the wheel drive shafts and extending through said continuously regulatable transmission, a two-speed connecting gear means which serves for the driving connection between said drive shaft and said take-off shaft including a double gear wheel comprising two coaxial gear members freely rotatably mounted on said driven shaft and operably connected to said drive shaft for said take-off shaft, said selectively engageable means for driving said take-off shaft at the speed of the tractor including meshing gears on said driven shaft and on said power take-off shaft, respectively, said meshing gears being operably connected to said reduction gear means and driven thereby, said driven shaft constituting the axis of rotation for said double gear wheel and one of the gears of said meshing gears, and selectively operable means for selectively connecting each of said coaxial gear members in driving relationship with said power take-off shaft.

8. A transmission arrangement for tractors, especially agricultural tractors, having an engine and a continuously adjustable hydrostatic transmission connected with the input shaft thereof to said engine and having a transmission output shaft, and wheel-drive-shaft means including a driven shaft, said arrangement comprising reduction gear means operatively connected with the input gear thereof to said output shaft, said driven shaft being operatively connected to the output gear of said reduction gear means, a main take-off shaft, a drive shaft for said main take-off shaft adapted to be operatively connected to said engine, and selectively engageable means for driving said main take-off shaft either in correspondence with the speed of the tractor or at one of several speeds in dependence on the engine including two-speed connecting gear means operatively and selectively connecting said drive shaft with said take-off shaft, said selectively engageable means further including selectively engageable connecting gear means operatively connecting said driven shaft with said main take-off shaft including a driving gear and a driven gear, said driving gear being mounted coaxially on said driven shaft and being operable to rotate in unison therewith, said two-speed connecting gear means including a double gear wheel comprising two coaxial gear members freely rotatably supported on said driven shaft intermediate said output gear and said driving gear, said selectively engageable means further including clutch means for selectively connecting said driven gear with said main take-off shaft to thereby provide the drive connection for the take-off shaft in dependence on the tractor speed, a further take-off shaft coaxial to said main take-off shaft, means for connecting said further take-off shaft with one of said coaxial gear members to thereby drive said further take-off shaft at one of said several speeds in dependence on the engine, and shifting gear means operatively connected with said main take-off shaft and forming part of said two-speed connecting gear means, said shifting gear means being provided with clutch teeth comprised in said clutch means.

9. A transmission arrangement for tractors, especially agricultural tractors, having an engine and a continuously adjustable hydrostatic transmission connected with the input shaft thereof to said engine and having a transmission output shaft, and wheel-drive-shaft means including a driven shaft, said arrangement comprising reduction gear means operatively connected with the input gear thereof to said output shaft, said driven shaft being operatively connected to the output gear of said reduction gear means, a main take-off shaft, a drive shaft for said main take-off shaft adapted to be operatively connected to said engine, said drive shaft being disposed above said driven shaft and extending through said transmission, and selectively engageable means for driving said main take-off shaft either in dependence on the speed of the tractor or at one of several speeds in dependence on the engine including two-speed connecting gear means operatively and selectively connecting said drive shaft with said take-off shaft, said selectively engageable means further including selectively engageable connecting gear means operatively connecting said driven shaft with said main take-off shaft including a driving gear and a driven gear, said driving gear being mounted coaxially to said driven shaft and being operable to rotate in unison therewith, said driven shaft being disposed between said drive shaft and said main take-off shaft, said two-speed connecting gear means including a double gear wheel comprising two coaxial gear members freely rotatably supported on said driven shaft intermediate said output gear and said driving gear, said selectively engageable means further including clutch means for selectively connecting said driven gear with said main take-off shaft to thereby provide the drive connection for the take-off shaft in dependence on the tractor speed, a further take-off shaft coaxial to said main take-off shaft, means including a gear on said further take-off shaft meshing with one of said coaxial gear members to thereby drive said further take-off shaft at one of said several speeds in dependence on the engine, said two-speed connecting gear means further including a further gear movably splined on said main take-off shaft for selective engagement with the other of said two coaxial gear members.

10. A transmission arrangement for tractors, especially agricultural tractors, having an engine and a continuously adjustable hydrostatic transmission directly connected with the input shaft thereof to said engine and having a transmission output shaft, and wheel-drive-shaft means including a driven shaft, said arrangement comprising reduction gear means operatively connected with the input gear thereof to said output shaft, said driven shaft being operatively connected to the output gear of said reduction gear means, a main take-off shaft, a drive shaft for said main take-off shaft adapted to be operatively connected to said engine, said drive shaft being disposed above said driven shaft and extending through said continuously adjustable transmission, and selectively engageable means for driving said main take-off shaft either in dependence on the speed of the tractor or at one of several speeds in dependence on the engine including two-speed connecting gear means operatively and selectively connecting said drive shaft with said take-off shaft, said selectively engageable means further including selectively engageable connecting gear means operatively connecting said driven shaft with said main take-off shaft including a driving gear and a driven gear, said driving gear being mounted coaxially to said driven shaft and being operable to rotate in unison therewith, said driven shaft being disposed between said drive shaft and said main take-off shaft, said two-speed connecting gear means including a double gear wheel comprising two coaxial gear members freely rotatably supported on said driven shaft intermediate said output gear and said driving gear, said selectively engageable means further including clutch means for selectively connecting said driven gear with said main take-off shaft to thereby provide the drive connection for the take-off shaft in dependence on the tractor speed, a further take-off shaft coaxial to said main take-off shaft, means for connecting said further take-off shaft with one of said coaxial gear members to thereby drive said further take-off shaft at one of said several speeds in dependence on the engine, and shifting gear means operatively connected with said main take-off shaft, said shifting gear means comprising a gear splined on said main take-off shaft and selectively movable into meshing engagement with another one of said coaxial gear members.

11. In a tractor having an engine and a continuously adjustable hydrostatic transmission provided with transmission input shaft means and transmission output shaft means, the latter being operable to drive the wheels of the tractor, a main take-off shaft, an auxiliary take-off shaft, and an auxiliary unit intended to be driven by the engine, the improvement essentially consisting of drive means for said take-off shafts including a drive shaft coaxial with at least a section of said continually adjustable hydrostatic transmission output shaft means and extending through said transmission, means for operatively connecting said drive shaft with said engine, and selectively engageable gear means including a double gear wheel comprising coaxial gear members operatively connecting said drive shaft with said main take-off shaft and said auxiliary take-off shaft and further including a plurality of gears coaxially arranged about a section of said transmission output shaft means, said last-mentioned section being disposed above said take-off shaft and below said drive shaft, said auxiliary unit being disposed substantially in extension of said drive shaft and being drivingly connected to said drive shaft, and means including said plurality of gears and said double gear wheel for selectively driving said main take-off shaft at several speeds including a variable speed corresponding to the speed of the tractor and a plurality of speeds proportional to the engine speed independent of the speed of the tractor, said means for selectively driving said main take-off shaft at several speeds further including a pair of gears, one gear of said pair being in mesh with one of said coaxial gear members, the other gear of said pair being mounted on said main take-off shaft in mesh with one of said plurality of gears.

12. A transmission arrangement for tractors, especially agricultural tractors, having an engine, a continuously adjustable hydrostatic transmission operatively connected with the input shaft thereof to said engine and having a transmission output shaft and a wheel drive shaft means, comprising reduction gear means operatively connected with said output shaft at the rear of the transmission as viewed in the normal direction of the transmission of torque, a driven shaft operatively connected to said reduction gear means, a take-off shaft, a drive shaft for said take-off shaft adapted to be operatively connected to said engine, said drive shaft being disposed above said driven shaft and extending through said transmission, and selectively engageable means for driving said take-off shaft either at a variable speed corresponding to the speed of the tractor or at one of several speeds in dependence on the engine including said drive shaft and two-speed connecting gear means operatively and selectively connecting said drive shaft with said take-off shaft, said driven shaft being disposed between said drive shaft and said take-off shaft, said connecting gear means including a double gear wheel comprising two coaxial gear members freely rotatably supported on said driven shaft, and selectively engageable means including selectively operable connecting gear means operatively connecting said driven shaft with said take-off shaft and providing the drive connection for the take-off shaft in dependence on the tractor speed, said two coaxial gear members being disposed intermediate a gear forming part of said reduction gear means and said selectively operable connecting gear means, said selectively operable connecting gear means including a gear mounted on said take-off shaft in mesh with a gear on said driven shaft and means for selectively establishing driving connections from said last-mentioned gears and said double gear wheel to said take-off shaft comprising a gear-clutch member movably splined on said take-off shaft and adapted to selectively and operatively engage said gear mounted on said take-off shaft for driving said take-off shaft at said variable speed, said gear-clutch member being adapted to selectively mesh with one of said two coaxial gear members for driving said take-off shaft at said one of several speeds.

13. In a tractor having an engine and a continuously adjustable hydrostatic transmission provided with transmission input shaft means and transmission output shaft means, the latter being operable to drive the wheels of the tractor, said transmission output shaft means comprising a driven shaft, a main take-off shaft and an auxiliary take-off shaft as well as at least one auxiliary unit intended to be driven by the engine, the improvement essentially consisting of drive means for said take-off shafts including a drive shaft coaxial with at least a section of said transmission output shaft means and extending through said transmission, means for operatively connecting said drive shaft with said engine, and selectively engageable means operatively connecting said drive shaft with said main take-off shaft and said auxiliary take-off shaft including a plurality of gears coaxially arranged on said driven shaft, said auxiliary unit being drivingly connected to said drive shaft, and means including said gears for selectively driving said main take-off shaft at several speeds including a variable speed proportional to the speed of the tractor and a plurality of speeds proportional to the engine speed independent of the speed of the tractor, said means including said gears further including a gear rotatably mounted on said main power take-off shaft, a gear fixed on said driven shaft and in mesh with said rotatably mounted gear, a gear-clutch member splined on said main power take-off shaft and adapted to selectively mesh with one of said plurality of gears and to make clutching engagement with said rotatably mounted gear, and a gear on said auxiliary take-off shaft in mesh with another of said plurality of gears.

14. A transmission arrangement for tractors, especially agricultural tractors, having an engine and a continuously adjustable hydrostatic transmission connected with the input shaft thereof to said engine and having a transmission output shaft, and wheel-drive-shaft means, comprising a reduction gear means having the input gear thereof connected to said output shaft, a driven shaft operatively connected to the output gear of said reduction gear means, a main take-off shaft, a drive shaft for said main take-off shaft adapted to be operatively connected to said engine, and selectively engageable means for driving said main take-off shaft either in correspondence with the speed of the tractor or at one of several speeds in dependence on the engine including two-speed connecting gear means operatively and selectively connecting said drive shaft with said take-off shaft, said selectively engageable means further including selectively engageable connecting gear and clutch means, selectively connecting said driven shaft with said main take-off shaft including a driving gear and a driven gear, said driving gear being mounted coaxially on said driven shaft, and being operable to rotate in unison therewith, said two-speed connecting gear means including a double gear wheel comprising two coaxial gear members freely rotatably supported on said driven shaft intermediate said output gear and said driving gear, and a gear member mounted on said main take-off shaft for rotative movement therewith and longitudinal movement relative thereto, one of said coaxial gear members being selectively engageable by said gear member mounted on said main take-off shaft, said gear and clutch means further including clutch means comprising a clutch member mounted on said main take-off shaft to rotate therewith and to be selectively moved longitudinally thereof, said gear and clutch means being effective to provide a drive connection for said main take-off shaft in correspondence on the tractor speed, said clutch means further comprising clutch means on said driven gear selectively engageable by said clutch member, said two-speed connecting gear means being effective to provide a drive connection for said main take-off shaft in correspondence with one of said several speeds of said engine, said two-speed connecting gear means further comprising a member provided with clutch teeth operably connected to the other of said coaxial gear members, said gear member mounted on said main take-off shaft being further provided with clutch engaging means for selective engagement with said clutch teeth.

References Cited by the Examiner

UNITED STATES PATENTS

| | | | |
|---|---|---|---|
| 2,168,033 | 8/39 | Johnston et al. | 74—15.86 X |
| 2,214,805 | 9/40 | Baker et al. | 74—15.86 X |
| 2,618,979 | 11/52 | Benning | 74—15.4 |
| 2,755,903 | 7/56 | McAninch et al. | 74—15.66 X |
| 2,932,202 | 4/60 | Rinkena | 74—15.86 |
| 2,945,382 | 7/60 | Ritter et al. | 74—15.63 X |
| 2,968,188 | 1/61 | Du Shane et al. | 74—15.66 X |
| 2,982,153 | 5/61 | Albertson et al. | 74—15.84 X |
| 3,011,353 | 12/61 | Friedrich et al. | 74—15.8 |
| 3,037,572 | 6/62 | Ritter | 74—15.8 X |
| 3,046,813 | 7/62 | Bixby | 74—15.86 X |

FOREIGN PATENTS

| | | |
|---|---|---|
| 572,538 | 11/58 | Belgium. |
| 1,117,587 | 5/56 | France. |
| 1,216,245 | 4/60 | France. |
| 594,922 | 6/59 | Italy. |

OTHER REFERENCES

German printed application 1,135,774, August 30, 1962, 74—15.86.

BROUGHTON G. DURHAM, *Primary Examiner.*